June 20, 1944.   R. TAUTY   2,352,036

DEVICE FOR ABSORBING SHOCKS, ESPECIALLY FOR PARACHUTES

Filed March 28, 1940   2 Sheets-Sheet 1

INVENTOR
RENÉ TAUTY

BY Bailey, Stephens & Huettig
ATTORNEYS

June 20, 1944.  R. TAUTY  2,352,036
DEVICE FOR ABSORBING SHOCKS, ESPECIALLY FOR PARACHUTES
Filed March 28, 1940   2 Sheets-Sheet 2

INVENTOR
RENÉ TAUTY,
BY Bailey Stephens Huettig
ATTORNEYS

Patented June 20, 1944

2,352,036

UNITED STATES PATENT OFFICE 2,352,036

DEVICE FOR ABSORBING SHOCKS, ESPECIALLY FOR PARACHUTES

René Tauty, Clichy, France; vested in the Alien Property Custodian

Application March 28, 1940, Serial No. 326,529
In France March 27, 1939

3 Claims. (Cl. 244—151)

The present invention relates to devices for absorbing shocks, and it is more especially, although not exclusively, concerned with devices for use in connection with parachutes or the like for absorbing the shock resulting from the opening of the parachute.

The chief object of the present invention is to provide a shock absorbing device of the type above described which is better adapted to meet the requirements of practice than the devices used up to the present time for the same purpose.

According to an essential feature of the present invention, means are provided for absorbing the shocks through the combination of two distinct actions chosen in such manner that their resultant varies according to a predetermined law during the time corresponding to the absorption of the shock produced, for instance, by the opening of the parachute.

According to another feature of the invention, at least one of the actions above mentioned is produced by the breaking, under the effect of the shock, of threads, seams, or the like, interconnecting two portions or elements which are to be torn apart under the effect of the shock produced by the opening of the parachute, and this action can be made variable in the course of the absorption of the shock.

Still another feature of the present invention relates to the case of parachutes having a shock absorbing device interposed between the parachute proper and the harness or the like, and at least one safety strap interconnecting these two parts. According to this feature of the invention, this safety strap is arranged to play a part in the shock absorbing action of the above mentioned device.

According to still another feature of the invention, one of the two distinct shock absorbing actions above mentioned is ensured by a system acting by friction and combined by a system acting by tearing of threads or the like, these two systems producing absorbing effects which vary in such manner that their combination produces the desired law of variation of the total shock absorbing effect.

When the parachute includes a safety strap as above mentioned, an interesting feature of the invention consists in folding the strap and sewing together the two portions thus folded on each other, whereby, under the effect of the shock, these two portions are torn away from each other so that the strap is given a straight shape, the breaking of the seams producing the desired shock absorbing action.

Other features of the present invention will result from the following detailed description of some specific embodiments thereof.

Preferred embodiments of the present invention will be hereinafter described, with reference to the accompanying drawings, given merely by way of example, and in which:

Fig. 3 is a separate perspective view on an enlarged scale showing the safety strap above referred to.

Figure 1:
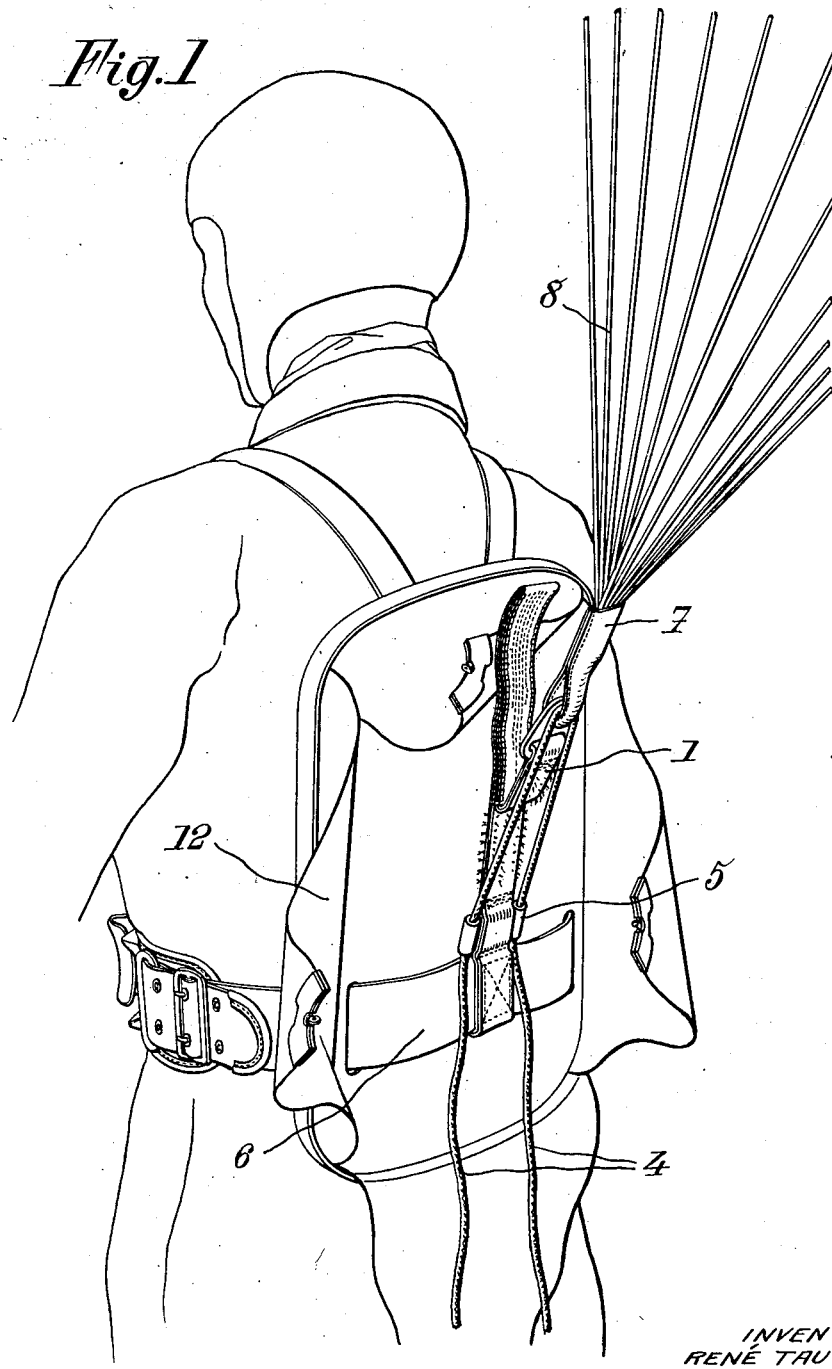
Fig. 1 is a perspective view of a parachute fixation device made according to the present invention; this device being of the belt type, the system being shown with the bag open and the parachute in the course of opening, such a system being provided with a shock absorbing device made according to a first embodiment of the invention.
Figure 2:
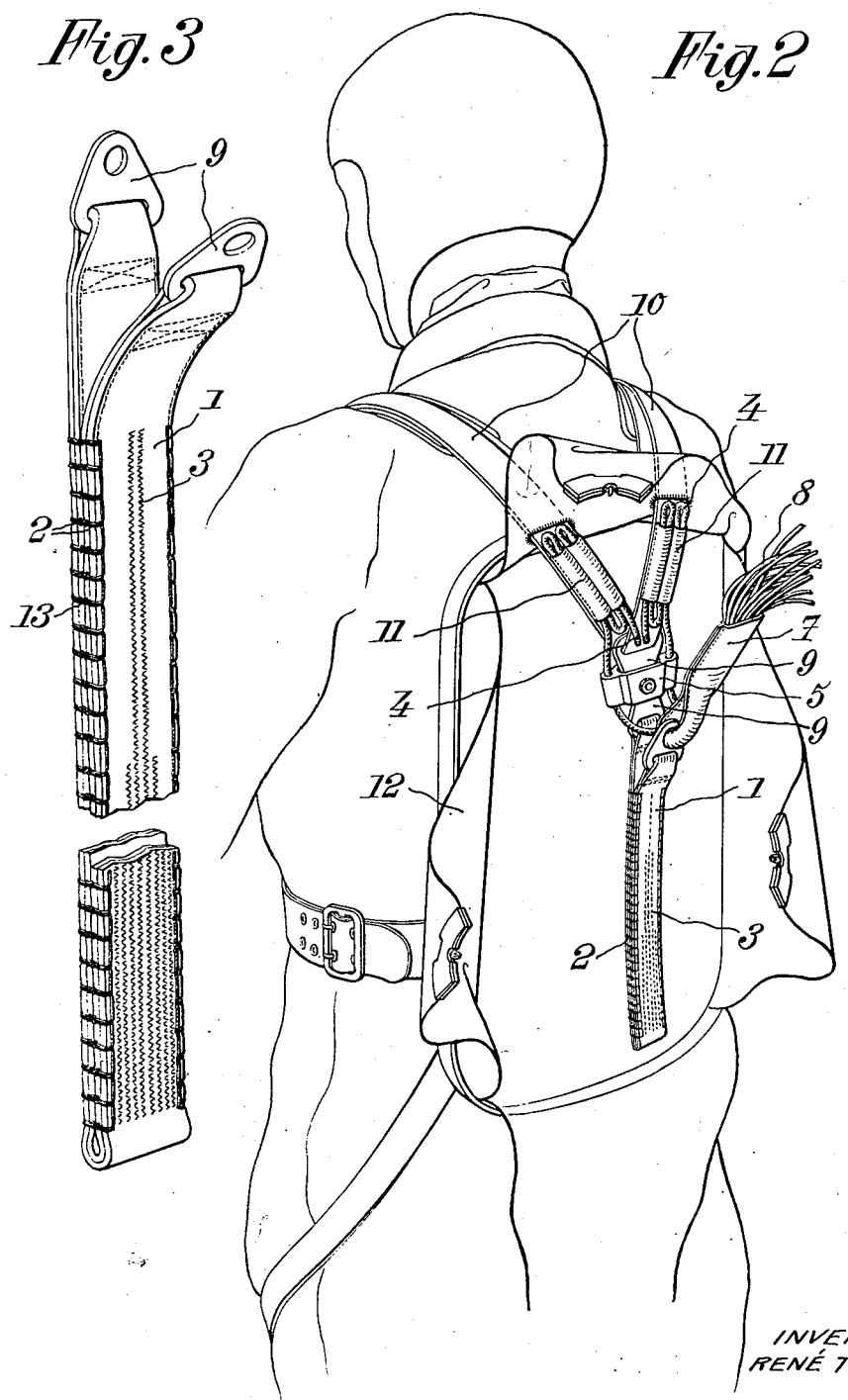
Fig. 2 is a similar view of a second embodiment of such a system, the parachute fixation means being of the harness type.

In the following description, it will be supposed that the invention is applied to the case of a parachute provided with a fixation system of a suitable kind (either of the belt type, as illustrated by Fig. 1, or of the harness type, as illustrated by Fig. 2) and that it is desired to provide such a parachute with means for absorbing the shock undergone by the parachutist when the parachute opens.

Devices have been imagined for this purpose, which are all based upon the use of means for yieldingly resisting the action which produces the shock so as to distribute over a relatively substantial period of time an action which otherwise would be practically instantaneous.

I have found that the law according to which the shock absorbing effort exerted by the means above mentioned is to vary during the time corresponding to the absorption of the shock if the desired result is to be obtained, is not complied with by the existing devices.

In particular, advantageously, the shock absorbing effort should keep substantially constant, or should even increase in a gradual manner after the opening of the chute.

Now, in the known devices in which the shock absorbing action is obtained by the action of the friction developed between parts in relative movement with respect to one another as a consequence of the opening of the parachute, the shock absorbing effort decreases, on the contrary, during the action, as a consequence of the rise of temperature and, ot the resulting expansion of the cooperating parts between which friction is to take place.

According to the present invention, this drawback is obviated by having recourse to shock absorbing means such that the shock absorbing effort can be determined in an accurate manner, during the action, according to a predetermined law. For instance, preferably, this effort remains practically uniform or increases gradually during the absorption of the shock.

There are various embodiments of such means, and, in particular, it would be possible to have recourse to devices such as hereinafter described acting by successive tearings of threads or the like, of such respective resistances as to produce the desired law of variation of the shock absorbing effort.

However, according to a preferred embodiment of the invention, the means in question are devised in such manner that the shock absorption results from the combination of at least two distinct actions which are suitably chosen so that their resultant produces the desired law of variation.

Such an arrangement is particularly interesting because it permits of utilizing, for exerting one of said actions (as it will be hereinafter assumed) a shock absorbing device of the known friction type, the defects of which are compensated, according to the invention, by the operation of the second shock absorbing device.

As for this second shock absorbing device, it is brought into play either concurrently with the first elementary shock absorbing device and for the whole time of the action thereof, or only during a portion of this time, for instance after the first action has already started.

This second elementary shock absorbing device may be of any suitable type.

For instance, it may be of the friction type corresponding to the first of the shock absorbing actions, but arranged in such manner as to work in a different way.

Or, as it will be hereinafter described, the shock absorbing device producing the second action is of a type working by the tearing or breaking of threads or seams the respective resistances of which are calculated in a predetermined manner.

The indication of these particular arrangements has no limitative character.

As above stated, according to a feature of the invention, in a device including shock absorbing means acting by tearing of threads or seams, for use in the case of a parachute, such a device is advantageously combined with the safety strap which serves to connect the parachute proper with the harness or the like, when such a safety strap is provided.

Figure 3:
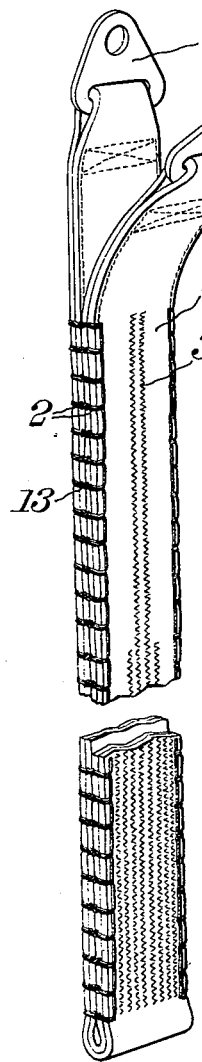

This arrangement is, for instance, illustrated by Fig. 3, in which said safety strap is folded at least once upon itself, the two branches of the fold being temporarily assembled to each other by seams such as 2, 3. The whole is connected to the cables 8 of the parachute proper and to the harness (or belt) of the parachute in such manner that a shock tends to open or unfold the safety strap by breaking the threads which form the seams in question.

It will be readily understood that, according to the arrangement that has been used for these seams, the shock absorbing action produced by their breaking or tearing off will vary accordingly. In the drawing, I have shown on the one hand, on the edges, stitches 2 provided at regular (or irregular) intervals, and, on the other hand, on the flat part of the strap, seams 3, the number of which increases when the strap is being unfolded. Therefore, the shock absorbing action increases gradually and compensates for the decrease of the shock absorbing action produced by the friction shock absorbing device during the same time.

Stitches 2 may be either sewn by means of the same thread on the two folds of the strap, or made distinct on said two folds and connected together by knots or the like 13, which start the breaking, these indications having no limitative character.

Concerning the friction shock absorbing device it can be made in many different ways. In the embodiment illustrated by the drawings, it consists of a cable having two branches 4 adapted to slide with a certain friction, under the effect of a shock, in at least one gripping element 5.

In the embodiment of Fig. 1, the invention is supposed to be applied to a fixation system of the belt type. One of the ends of the safety strap 1 is fixed to said belt 6. The gripping element 5 is itself carried by the belt or, as shown by the drawings, by the safety strap. The other end of said strap is fixed to an element 7, itself secured to cables 8. Cable 5 is also fixed to said element 7.

In Fig. 2, the invention is shown applied to a fixation system of the harness type. In this example, the gripping element 5 is carried by an element 9 secured to two straps 10 of the harness. One of the ends of the safety strap 1 is secured to the other end of element 9.

It should be noted that, according to an advantageous arrangement illustrated by Fig. 2, the two branches of cable 4 may be folded on the inside of small sockets 11 provided on straps 10 or any other part of the harness.

Of course, the bag 12 which is to contain the parachute when the latter is folded may be of any suitable type.

Whatever be the particular embodiment that is chosen, the parachute according to the invention will work in the following manner:

When the parachute is opened, the shock that is transmitted to the belt or the harness produces, on the one hand, the slipping of cable 4 in its gripping element and, on the other hand, gradual breakings or tearings of the various stitches and seams 2, 3. As a consequence of the heating, gripping element 5 expands and cable 4, being no longer so tightly held therein, is not braked to the same degree. But this reduction of the shock absorbing effort is compensated by the resistance of the stitches and seams. Therefore, it is possible to obtain a resultant which varies according to any desired law, which is a considerable advantage over prior devices used for the same purpose.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the present invention the scope of which is determined by the accompanying claims.

What I claim is:

1. In a parachute system, a shock absorbing assembly constituting the sole connection with the parachute comprising, a folded strap attached at one end to the parachute and at the other end to attaching structure, said folded strap being folded at its center with its two halves in face-to-face relationship and with its two ends adjacent each other, frangible threads extending through the halves of the strap holding the two halves in face-to-face relationship, said threads being formed by rows of stitching extending longitudinally of the strap with all of the rows extending from the ends of the halves at the folded center of the strap toward the strap ends with the various rows being of progressively decreasing lengths whereby a minimum number of stitches occur at the strap ends and the number of stitches increases remote from these ends, and a friction means mechanically connecting the strap ends comprising a cord attached at one end of the strap and extending through a restricted hole at the other end of the strap, whereby the initial shock when the parachute starts to pull is absorbed entirely by said friction means and thereafter the strap is drawn taut whereby the frangible threads are broken in increasing numbers.

2. In a parachute construction as described in claim 1 wherein the two edges of said strap are also stitched together at their edges, and wherein said friction means is effective throughout the breaking of the frangible threads but with a decreasing action.

3. In a parachute system, a shock absorbing assembly constituting the sole connection with the parachute comprising, a tearable strap unit having two attaching portions which are held adjacent and which are separated by the severing of frangible holding threads whereby the pulling apart of the two attaching portions is resisted by the force effective to sever the frangible threads, and friction means independent of said strap unit but connected between said attaching portions comprising means to exert an extended frictional effect which absorbs the initial shock of any sudden pull by the parachute but which is then relieved by the cooperating action of said strap unit, whereby the strap unit is slowly drawn taut so that the severing action of the threads takes place relatively slowly.

RENÉ TAUTY.